(12) United States Patent
Tang et al.

(10) Patent No.: US 7,652,858 B2
(45) Date of Patent: Jan. 26, 2010

(54) PROTECTION FOR PERMANENT MAGNET MOTOR CONTROL CIRCUITS

(75) Inventors: David Tang, Fontana, CA (US); Brian A Welchko, Torrance, CA (US); Silva Hiti, Redondo Beach, CA (US); Mark L Selogie, Manhattan Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 258 days.

(21) Appl. No.: 11/758,974

(22) Filed: Jun. 6, 2007

(65) Prior Publication Data

US 2008/0304189 A1    Dec. 11, 2008

(51) Int. Cl.
*H02H 7/09* (2006.01)
(52) U.S. Cl. ............... 361/33; 361/18; 361/98; 361/23; 363/37
(58) Field of Classification Search ............ 361/18, 361/98, 23, 33; 363/37
See application file for complete search history.

(56) References Cited

U.S. PATENT DOCUMENTS

| | | | | |
|---|---|---|---|---|
| 5,687,049 A * | 11/1997 | Mangtani | ............... | 361/18 |
| 5,757,599 A * | 5/1998 | Crane | ............... | 361/56 |
| 7,274,243 B2 * | 9/2007 | Pace et al. | ............... | 327/396 |
| 7,339,803 B2 * | 3/2008 | Nojima | ............... | 363/37 |
| 2004/0024937 A1 * | 2/2004 | Duncan et al. | ............... | 710/100 |
| 2005/0253165 A1 * | 11/2005 | Pace et al. | ............... | 257/139 |
| 2006/0044025 A1 * | 3/2006 | Grbovic | ............... | 327/112 |
| 2006/0245222 A1 * | 11/2006 | Nojima | ............... | 363/132 |
| 2008/0129238 A1 * | 6/2008 | Andersen | ............... | 318/565 |

* cited by examiner

*Primary Examiner*—Rita Leykin

(57) ABSTRACT

Methods and apparatus are provided for protecting a motor control circuit in a permanent magnet electric motor system. The permanent magnet electric motor system includes a permanent magnet electric motor having a predetermined number of windings corresponding to the phases of the permanent magnet electric motor and a direct current (DC) bus coupled to a power source for providing operational power for the electric motor system. A motor control circuit is connected to the DC bus for receiving the operational power therefrom and is connected to the windings of the permanent magnet electric motor for controlling the permanent magnet electric motor. A protection circuit is connected to the DC bus for receiving the voltage therefrom for operation of the protection circuit and for detecting predetermined motor control circuit fault conditions from voltage sensed on the DC bus and in response thereto providing protection for the motor control circuit.

19 Claims, 3 Drawing Sheets

US 7,652,858 B2

PROTECTION FOR PERMANENT MAGNET MOTOR CONTROL CIRCUITS

TECHNICAL FIELD

The present invention generally relates to permanent magnet electric motor systems, and more particularly relates to protection of permanent magnet motor control circuits, such as inverters, in permanent magnet electric motor systems.

BACKGROUND OF THE INVENTION

Permanent magnet electric motor systems typically include permanent magnet motor control circuits, such as inverters. Malfunctions in such motor control circuits can be caused by a large number of potential problems. For example, loss of bias power of the inverter, microprocessor malfunction, power switch malfunction or sensor malfunctions may cause the inverter to malfunction. In order to protect against such malfunctions, a fault handling strategy needs to be provided. However, many such fault handling strategies provide multiple fault modes which require extraneous information to either employ one or more of the strategies or switch between utilization of the various strategies.

Accordingly, it is desirable to provide a motor control circuit protection scheme which does not require extraneous information. In addition, it is desirable to provide a motor control protection scheme which is utilizable as either a primary protection for an inverter or a redundant backup protection for the inverter. Furthermore, other desirable features and characteristics of the present invention will become apparent from the subsequent detailed description and the appended claims, taken in conjunction with the accompanying drawings and the foregoing technical field and background.

SUMMARY OF THE INVENTION

An inverter protection circuit is provided for protecting an inverter which operates from voltage supplied by a direct current (DC) bus to control a synchronous motor. The inverter protection circuit includes a protection controller and a power supply. The protection controller is coupled to the motor control circuit and detects predetermined motor control circuit fault conditions. The power supply is coupled to the DC bus and the protection controller for utilizing the voltage provided from the DC bus to power the protection controller.

A method is provided for protecting a motor control circuit in an electric motor system. The method includes the step of sensing predetermined motor control circuit fault conditions on a DC bus which provides power to the motor control circuit by a protection circuit powered by the DC bus.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
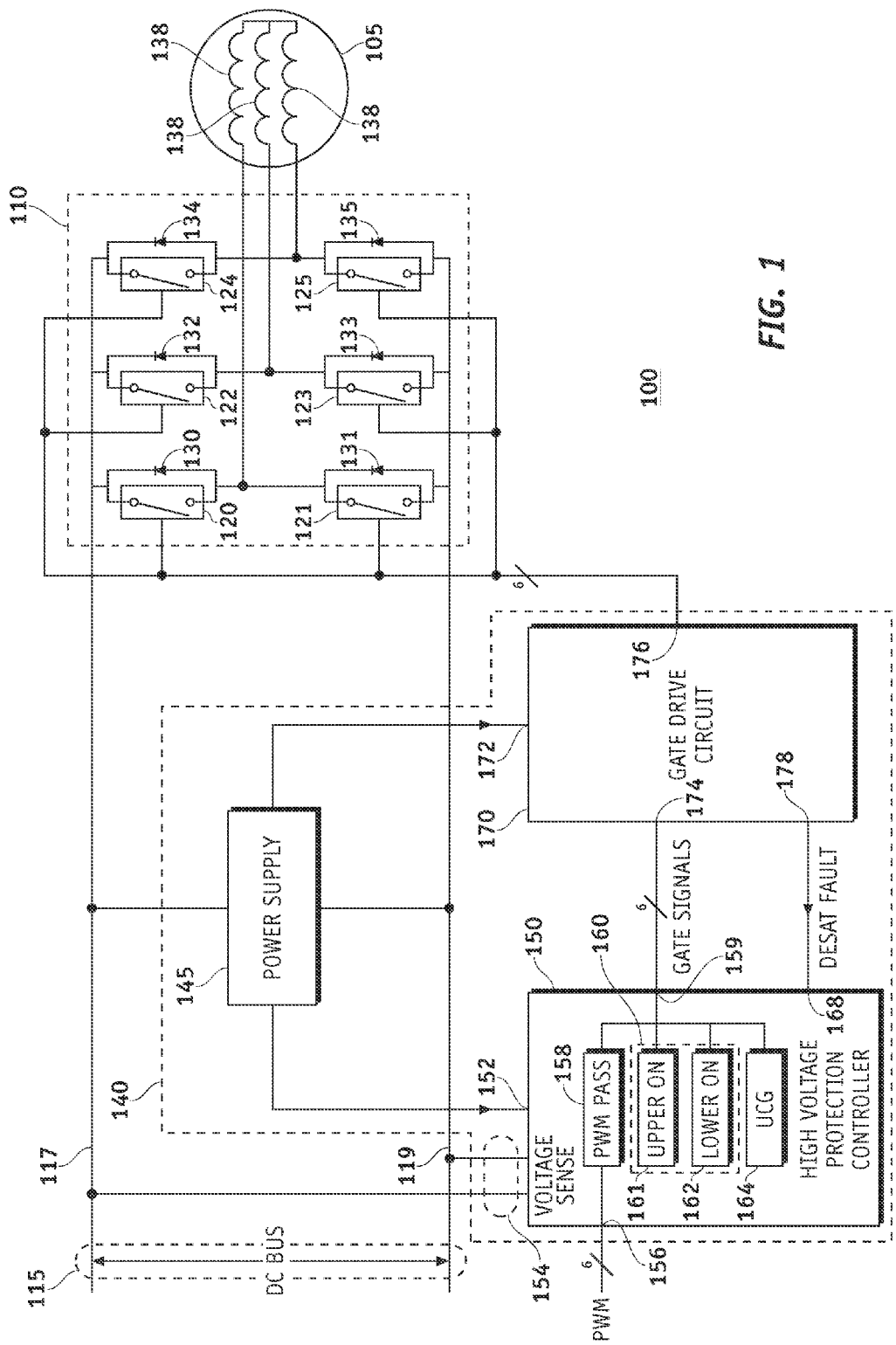
FIG. 1 depicts a block diagram of a permanent magnet electric motor system in accordance with an embodiment of the present invention.

Referring to FIG. 1, a permanent magnet electric motor system 100, such as an electric drive system for a hybrid automobile, includes a permanent magnet electric motor 105, such as an interior permanent magnet (IPM) synchronous motor having three phases. A motor control circuit, such as an inverter 110, receives power from a power source (not shown), such as a battery or fuel cell, via a DC bus 115 having a high voltage node 117 and a low voltage node 119 and is coupled to the motor 105 for control thereof. The inverter 110 is, for example, a three phase voltage source inverter, such as the three-leg inverter 110 depicted in FIG. 1, which includes switching elements 120, 121, 122, 123, 124, 125 and antiparallel diodes 130, 131, 132, 133, 134, 135.

While a three-leg inverter 110 is depicted in FIG. 1 as the motor control circuit, the present invention is not limited to this type of inverter. In accordance with the embodiment of the present invention, the motor control circuit may be any type of inverter 110 or other voltage source control circuitry which utilizes one or more switching elements to control the voltage across the phases of the motor 105. Three-phase voltage source inverters, such as the three-leg inverter 110, are commonly employed to control the magnitude and frequency of the motor phase currents in electric motor systems 100 of hybrid automotive vehicles, including electric battery- and fuel cell-powered vehicles. When the motor 105 in such an electric motor system 100 is an IPM motor, the reaction of the electric motor system 100 to various inverter 110 based faults is of concern.

For example, the three-phase permanent magnet motor 105 includes a rotor and three windings 138 and inherently produces back electromotive force (back-EMF) with the mechanical rotation of the rotor. The level of the back-EMF voltage is dependent on the speed of the motor 105. At a sufficiently high motor speed, the back-EMF produced exceeds the voltage on the DC bus 115 providing power to the inverter 110 and uncontrolled generation (UCG) of back-EMF voltage ensues. UCG is prevented during normal inverter 110 operation by means of field weakening generated by the inverter 110. Field weakening reduces the back-EMF voltage to maintain it at a level below the DC bus 115 voltage so that UCG of the back-EMF voltage does not occur.

If an inverter 110 fault occurs while the motor 105 is at high speed, however, inverter 110 operation ceases and inverter-generated field weakening will be lost, resulting in UCG of back-EMF voltage. During UCG, the inverter 110 behaves like a full bridge rectifier with the DC link (i.e., DC bus 115) serving as the load. The kinetic energy of the vehicle is converted to electric power and is dumped into the DC link. The amount of current and torque generated by the motor is not controllable and, in order to prevent the flow of current from the UCG of the back-EMF voltage into the battery connected to the DC link, a typical course of action is to open high voltage contacts (not shown) on the DC bus 115 between the battery and the inverter 110. Without the battery acting as the load, the DC bus 115 voltage increases rapidly and may damage the inverter 110.

In accordance with the embodiment of the present invention, a protection circuit 140 includes a power supply 145, a protection controller 150, such as a High Voltage Protection (HVP) controller, and a gate drive circuit 170. The power supply 145 is connected to the DC bus 115 for generating bias power and providing the bias power to the protection controller 150 and the gate drive circuit 170 as operational voltage therefor. For protection of the motor control circuit 110 and the motor 105, it is necessary to confine the DC bus 115 voltage within a safe operational level. Therefore, utilizing the DC bus 115 voltage to power the protection circuit 140 in accordance with this embodiment advantageously provides a reliable power source for the protection controller 150 and the gate drive circuit 170. Any other source of power utilized for the protection circuit 140 would introduce a potential failure mechanism into the protection circuit 140.

The protection controller 150 has a bias power input 152 connected to the power supply 140 for receiving bias power generated from the DC bus 115 voltage and a fault detecting input 154, such as a voltage sense input, connected to the high voltage node 117 and the low voltage node 119 of the DC bus 115. The protection controller 150 utilizes the fault detecting input 154 to determine predetermined motor control fault conditions in response to the voltage sensed across the DC bus 115 at the fault detecting input 154.

A motor control processor (not shown) provides high frequency pulse width modulated (PWM) signals to a PWM input 156 of the protection controller 150. In a manner well-known to those skilled in the art, the motor control processor generates the PWM signal in a predetermined manner for control of the switching elements 120, 121, 122, 123, 124, 125 to regulate the fundamental component of the motor phase voltage to a desired amplitude, phase, and frequency. In response to voltages sensed at the fault detecting input 154, the protection controller 150 will either have a PWM pass module 158 pass the PWM signals to a gate signal output 159 or, in response to sensed voltages indicating predetermined motor control fault conditions, signal the PWM pass module 158 to block the PWM signals and have either a first fault response component 160 or a second fault response component 164 generate gate protection signals and provide the gate protection signals to the output 159.

The gate drive circuit 170 has a bias power input 172 connected to the power supply 145 for receiving operational power therefrom. The gate drive circuit 170 is a conventional circuit well-known to those skilled in the art which receives bias power at the bias power input 172 and, in response to either the PWM signals or the gate protection signals received at a gate signal input 174 connected to the output 159 of the protection controller 150 provides gate signals via an output 176 to the switching elements 120, 121, 122, 123, 124, 125 for gate control operation thereof. Thus, during normal operation, the gate drive circuit 170 will provide the high frequency PWM signal as a PWM gate control signal to the switching elements 120, 121, 122, 123, 124, 125 to regulate the fundamental component of the motor 105 phase voltage to a desired amplitude, phase, and frequency. When a predetermined motor control fault condition is detected by the protection controller 150, however, the gate drive circuit 170 will provide fault drive signals generated in response to fault condition generated gate protection signals.

In accordance with the embodiment of the present invention, the protection controller 150 utilizes two fault modes to handle predetermined motor control fault conditions. The first fault mode is a "symmetrical three-phase short-circuit response" and is accomplished by the first fault response component 160 which turns on all upper switching elements 120, 122, 124 of the three-phase inverter 110 by first gate protection signals generated by an "upper on" module 161 or all lower switching elements 121, 123, 125 of the three-phase inverter 110 by second gate protection signals generated by a "lower on" module 162. Turning on all upper switching elements 120, 122, 124 or all lower switching elements 121, 123, 125 of the three-phase inverter 110 by gate protection signals directly connects the windings 138 of the motor 105 to the high voltage node 117 of the DC bus 115 or the low voltage node 119 of the DC bus 115, respectively. The symmetrical short-circuit fault response minimizes the post-fault braking torque when the machine is above a threshold speed.

The second fault mode, "un-controlled generation response", minimizes the value of the braking torque induced as the system speed is decreased below a threshold speed and is accomplished by the second fault response component 164 generating third gate protection signals to turn off all six switching elements 120, 121, 122, 123, 124, 125. Turning off all switching elements 120, 121, 122, 123, 124, 125 opens the switching elements 120, 121, 122, 123, 124, 125 to connect the DC bus 115 to the windings 138 of the motor 105 through the antiparallel diodes 130, 131, 132, 133, 134, 135, thereby allowing for UCG of back-EMF voltage.

In response to receiving the first gate protection signals, the gate drive circuit 170 generates first fault drive signals and provides them to the upper three switching elements 120, 122, 124 to directly connect the high voltage node 117 of the DC bus 115 to each of the windings 138 of the motor 105. Similarly, in response to receiving the second gate protection signals, the gate drive circuit 170 generates second fault drive signals and provides the second fault drive signals to the lower three switching elements 121, 123, 125 to directly connect the low voltage node 119 of the DC bus 115 directly to each of the windings 138 of the motor 105. In response to receiving the third gate protection signals, the gate drive circuit 170 generates third fault drive signals which are provided to the six switching elements 120, 121, 122, 123, 124, 125 to open the switching elements.

Thus it can be seen that the protection circuit 140 in accordance with the embodiment of the present invention circuit monitors the DC bus 115 voltage connected to the inverter 110 and activates predetermined fault modes at machine-specific threshold voltages for protection of the inverter 110. In addition, the DC bus 115 voltage not only provides the control parameter for detecting predetermined inverter fault conditions, but also supplies the operational voltage for the protection circuit 150 and gate drive circuit 170 via power supply 145, with no additional source of bias power required.

In accordance with the embodiment of the present invention, the protection circuit 140 also incorporates additional features that improve functionality including desaturation fault monitoring. When the inverter 110 shuts down in response to a hard failure of one of the switching elements 120, 121, 122, 123, 124, 125, the protection controller 150 interprets the inverter 110 shut down as a fault and applies a three-phase short by turning on all upper switching elements 120, 122, 124 or all lower switching elements 121, 123, 125. The three-phase short, however, may induce another fault that once again disables the inverter, hence rendering the protection scheme of the protection circuit 140 non-functional.

In accordance with the embodiment of the present invention, the gate drive circuit 170 monitors the inverter 110 to determine if one of the activated switching elements has failed and a desaturation fault has occurred. In response to detecting a desaturation fault, the gate drive circuit 170 provides a fault signal to a desaturation fault output 178 for provision to the protection controller 150. In response to detection of the fault signal at a desaturation fault input 168, the protection controller 150 can correct the desaturation problem by turning on the non-activated set of upper or lower switching elements to activate the three phase short.

For example, if one of the lower switching elements 121, 123, 125 fails and causes a short thereacross, and the attempted three-phase short was to turn on all of the upper switching elements 120, 122, 124, then a desaturation fault will occur due to excessive current. Once the protection controller 150 detects the fault signal at the desaturation fault input 168, the protection controller 150 can provide appropriate gate signals to the gate drive circuit 170 to turn off all of the upper switching elements 120, 122, 124 and turn on all of the lower switching elements 121, 123, 125 instead. In this manner, the desaturation fault is avoided and a three-phase short is successfully applied to the motor 105.

Figure 2:
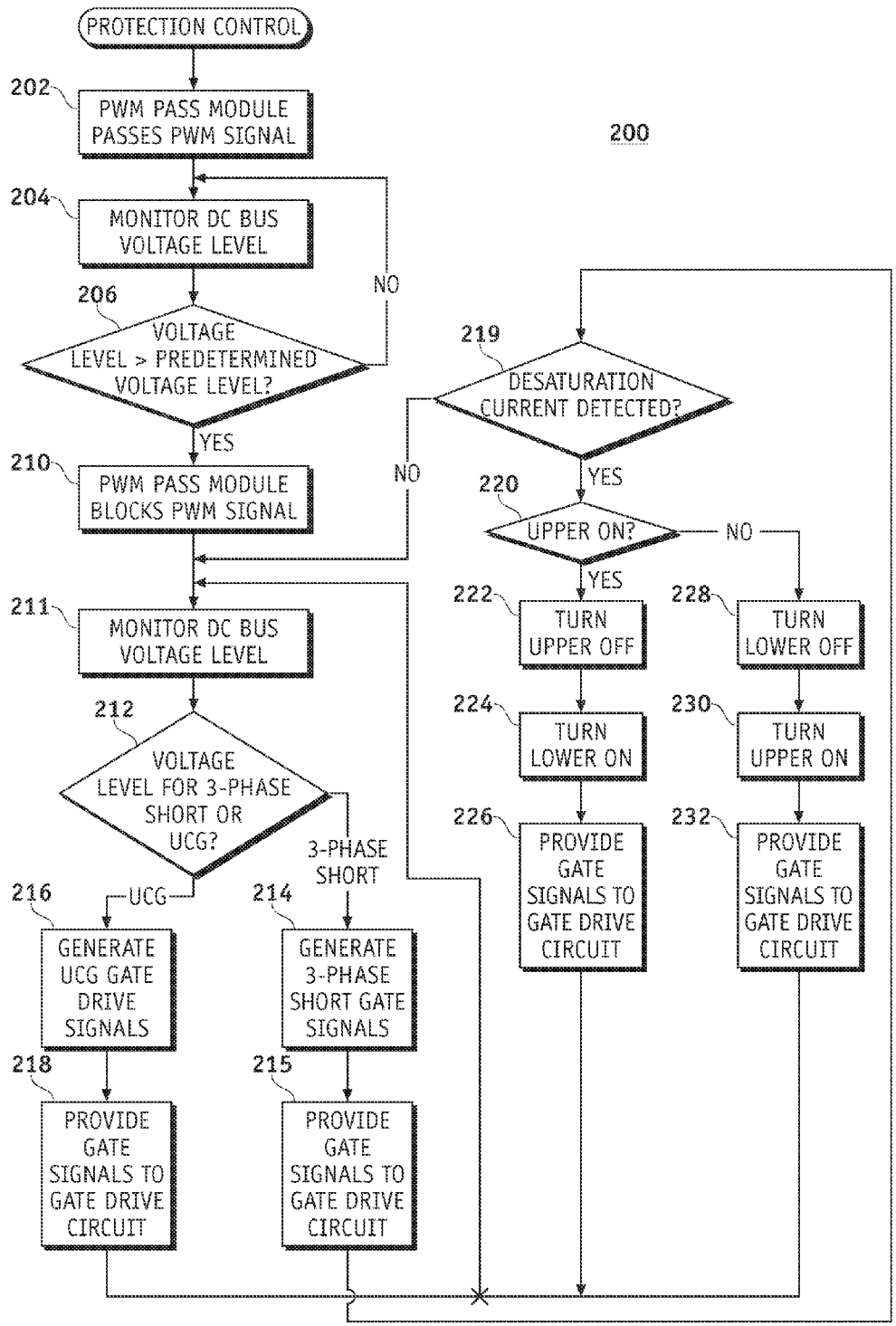
FIG. 2 depicts a flowchart of the operation of the protection circuit of the electric motor system of FIG. 1 in accordance with the embodiment of the present invention.

Referring to FIG. 2, a flowchart 200 depicting the operation of the protection controller 150 in accordance with the embodiment of the present invention initially activates 202 the PWM pass module 156 so that the PWM signals are passed therethrough and provided to the gate drive circuit 160 as gate signals. The protection controller then monitors 204 the voltage on the DC bus 115 at the voltage sense input 154 to determine if the voltage sensed is greater than a predetermined DC bus 115 voltage level 206. If the voltage sensed is not greater than the predetermined voltage level 206, the protection controller 150 continues to provide the PWM signals 202 as the gate signals while monitoring 204 the DC bus 115.

When the voltage sensed is greater than the predetermined voltage level, a predetermined inverter 110 fault condition has been detected 206. Predetermined inverter 110 fault conditions include, for example, disablement of the inverter 110 by a serious fault such as an Insulated Gate Bipolar Transistor (IGBT) desaturation fault, a loss of bias power, a microcontroller malfunction, or a DC bus over-voltage or over-current condition. During such serious inverter 110 fault conditions, operation of the inverter 110 may cease.

In order to timely respond to such fault conditions, the protection controller 150 continually monitors 204 the DC bus 115 voltage at the voltage sense input 154 to detect when the DC bus 115 voltage level becomes greater than the predetermined voltage level. The predetermined voltage level is a three phase short activation threshold voltage. As the DC bus 115 voltage reaches the three phase short activation threshold, the protection controller signals the PWM pass module 158 to block 210 normal PWM signals from being provided to the gate drive circuit 170 as gate signals.

Two main classes of system 100 fault responses can be classified as open-circuit type responses and short-circuit type responses. For inverter 110 driven IPM motors 105, one open-circuit type fault response results when the drive signals to all of the inverter 110 switching elements 120, 121, 122, 123, 124, 125 are turned off, or disconnected (i.e., all of the switching elements 120, 121, 122, 123, 124, 125 are opened). During this response, the motor 105 is connected to the DC bus 115 via the antiparallel diodes 130, 131, 132, 133, 134, 135 associated with the switching elements 120, 121, 122, 123, 124, 125. The antiparallel diodes 130, 131, 132, 133, 134, 135 create a potential path for current to flow which is dependant upon the motor 105 and the DC bus 115 operating conditions.

During short-circuit type fault responses, such as three-phase short responses, all of the windings 138 of the motor 105 are shorted to one of the DC bus 115 nodes 117, 119 by closing either all upper switching elements 120, 122, 124 or all lower switching elements 121, 123, 125 to produce a three phase short at the inverter 110 inputs to the motor 105. The short-circuit torque is independent of the DC bus 115 condition and is only a function of the motor 105 characteristics since the DC bus 115 is effectively removed from the system 100 during such fault responses.

The fault response where the drive signals have been turned off or disconnected has been termed uncontrolled generator (UCG) mode operation since the motor 105 operates as a generator during this fault condition. In contrast to short-circuit mode operation, a UCG mode operation will induce currents (and hence develop torque) to begin flowing such that the magnet-based back-EMF voltage produced by the motor 105 exceeds the DC bus 115 voltage through the inverter 110 antiparallel diodes 130, 131, 132, 133, 134, 135. As a result, the speed at which current conduction begins is dependant upon both the motor 105 parameters (such as the speed of the motor 105) and the DC bus 115 operating conditions. If the motor 105 is at a sufficiently high speed at the time of an inverter 110 fault, a UCG mode ensues and the DC bus 115 voltage increases.

To respond to the fault conditions in accordance with the embodiment of the present invention, the protection controller 150 monitors the DC bus 115 voltage level 211 by sensing the voltage at the voltage sense input 154 and determines in response to the voltage level sensed whether to provide short-circuit type responses (i.e., 3-phase short) or open-circuit type responses (i.e., UCG). In accordance with this embodiment, the short-circuit type response is a symmetrical three-phase short-circuit applied to the motor terminals by commanding the three upper switching elements 120, 122, 124 or the three lower switching elements 121, 123, 125 of the inverter 110 to close. The symmetrical short-circuit fault response minimizes the post-fault braking torque when the machine is above a threshold speed. In accordance with the embodiment of the present invention, the DC bus 115 voltage level is utilized, rather than the speed of the motor 105, to determine whether to provide the short-circuit fault response. When it is determined 212 that a short circuit response is appropriate based upon the voltage level sensed on the DC bus 115 being greater than the threshold three-phase short voltage level, the protection controller 150 signals either the "upper on" component 161 or the "lower on" component 162 to generate gate signals 214 and provide the gate signals 215 to the gate drive circuit 170. The gate drive circuit 170 then provides drive signals to either all upper switching elements 120, 122, 124 or all lower switching elements 121, 123, 125 to produce a three phase short at the inverter 110 inputs to the motor 105.

The open-circuit type response is UCG mode operation produced by gating off (i.e., opening) all of the six inverter switches. As the system speed is decreased below the threshold speed, the UCG mode minimizes the value of the braking torque induced. In accordance with the embodiment of the present invention, the DC bus 115 voltage level is also utilized to determine whether to provide the open-circuit fault response. Thus, when it is determined 212 that an open-circuit response is appropriate based upon the voltage level sensed on the DC bus 115 being less than the threshold UCG voltage level, the protection controller 150 signals the UCG module 164 to generate appropriate signaling 216 (e.g., gate signals) to open all of the switching elements 120, 121, 122, 123, 124, 125 and provides the appropriate signaling 218 to the gate drive circuit 170. The gate drive circuit 170 then provides appropriate signaling to all of the switching elements 120, 121, 122, 123, 124, 125 to produce UCG mode operation. After providing the gate signals 218 to the gate drive circuit 170, processing of the protection controller 150 returns to step 211 to monitor the DC bus 115 voltage level and determine 212 whether to provide short-circuit type responses (i.e., 3-phase short) or open-circuit type responses (i.e., UCG).

During three-phase short mode, a desaturation fault may occur. As previously described, when the drive circuit 170 detects a desaturation fault, a desaturation fault signal is provided to the desaturation fault input 168 of the protection controller 150. Therefore, after the three-phase short gate signals are provided 215 to the gate drive circuit 170, processing of the protection controller 150 determines 219 whether a desaturation fault signal is detected at the input 168. When a desaturation fault signal is detected 219 at the input 168 indicating that desaturation fault monitoring of current on the DC bus 115 by the gate drive circuit 170 has detected excessive current, the protection controller 150 attempts to correct the desaturation fault by turning off (i.e., opening) the activated set of upper or lower switching elements and turning on (i.e., closing) the non-activated set of upper or lower switching elements to activate the three phase short. Accordingly, when a desaturation fault is detected 219 during provision of a three-phase short, processing determines whether the "upper on" component 161 or the "lower on" component 162 is activated 220.

If the "upper on" component 161 is activated 220, the "upper on" component 161 is turned off 222, the "lower on" component 162 is activated 224 and gate signals are provided 226 to the gate control circuit 170 to provide appropriate drive signals to open the upper switching elements 120, 122, 124 and close the lower switching elements 121, 123, 125. In this manner, when one of the lower switching elements 121, 123, 125 fails and causes a short thereacross, and the attempted three-phase short was to turn on all of the upper switching elements 120, 122, 124, detection of excessive current indicates a desaturation fault and the protection controller 150 can provide appropriate gate signals to the gate drive circuit 170 to turn off all of the upper switching elements 120, 122, 124 and turn on all of the lower switching elements 121, 123, 125, thereby avoiding the desaturation fault while successfully applying a three-phase short to the motor 105.

If, on the other hand, the "upper on" component 161 is not activated 220, the "lower on" component 162 is turned off 228, the "upper on" component 161 is activated 230 and gate signals are provided 232 to the gate control circuit 170 to provide appropriate drive signals to open the lower switching elements 121, 123, 125 and close the upper switching elements 120, 122, 124. After appropriate gate signals are provided 226, 232 to the gate drive circuit 170, processing returns to determine whether the desaturation fault has been corrected (i.e., the current has reduced to an acceptable level).

Thus, operation of the protection controller in accordance with the embodiment of the present invention implements activation of a three-phase short or a UCG mode operation in the electric motor system 100 in response to detection of a machine-specific threshold voltage as detected while monitoring 204 the DC bus 115 voltage applied to the inverter 110. Hence, the two fault modes (the symmetrical three-phase short-circuit response and the three-phase un-controlled generation (UCG) mode fault response) are employed in accordance with the embodiment of the present invention. The symmetrical short-circuit fault response minimizes the post-fault braking torque when the electric motor system 100 is operating above a threshold speed. As the system speed is decreased below the threshold speed, the system 100 gates off the six inverter 110 switching elements 120, 121, 122, 123, 124, 125 to induce a three-phase UCG mode fault response in order to minimize the value of the braking torque induced. Since during some fault conditions the motor speed may not be available, operation in accordance with the embodiment of the present invention is permitted with nothing more than the DC bus voltage without relying on any external source of power, sensor information, or feedback. Thus, operation in accordance with the embodiment of the present invention advantageously utilizes the DC bus 115 voltage as the control parameter for predetermined fault condition detection 206 as well as utilizing the DC bus 115 voltage as the sole bias power supply for the protection circuit 150 with no additional source of bias power required.

Figure 3:
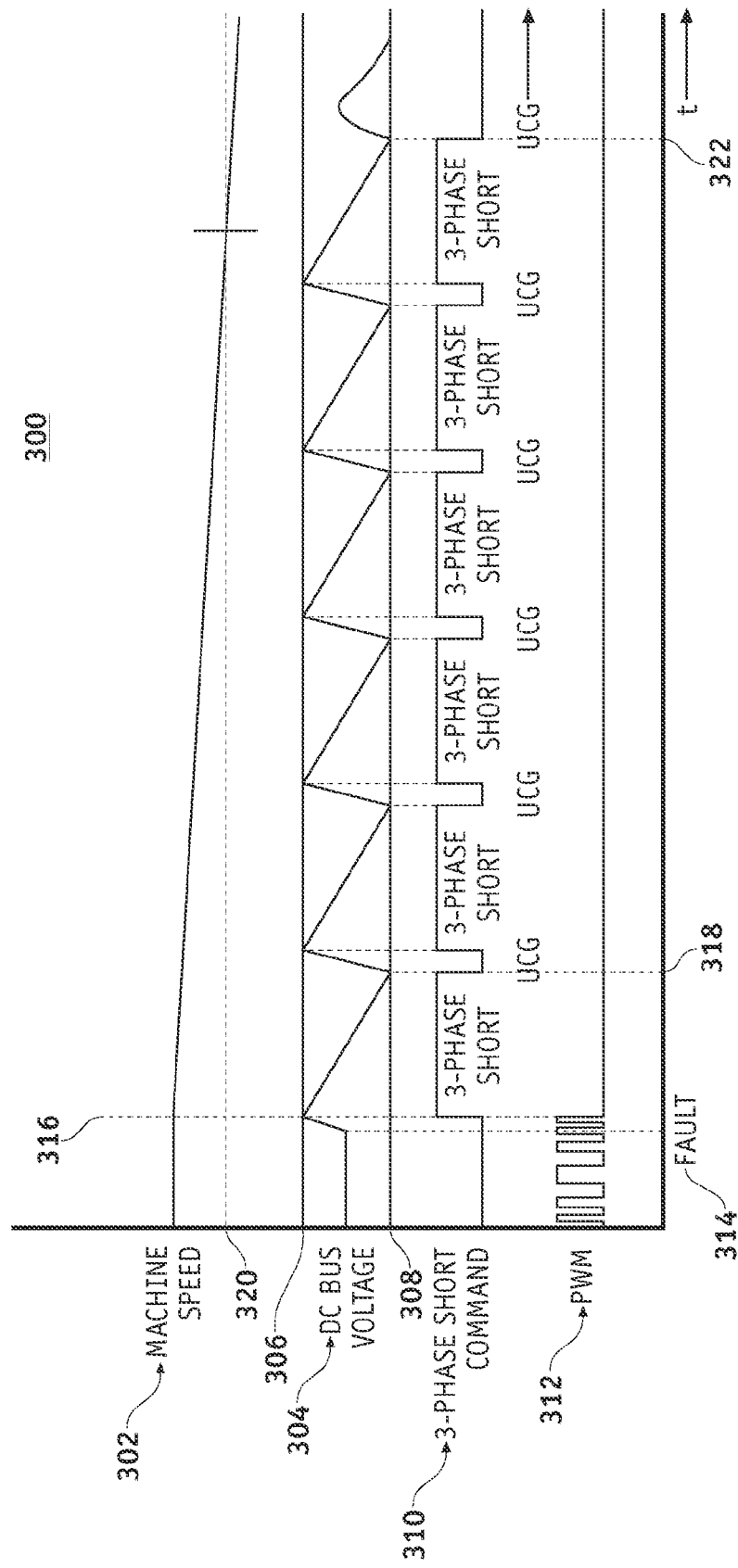
FIG. 3 depicts a timing diagram of the operation of the protection circuit of the electric motor system of FIG. 1 in accordance with the embodiment of the present invention.

Referring to FIG. 3, a timing diagram 300 shows, from top to bottom, the speed 302 of the motor 105, the voltage level 304 on the DC bus 115 between an upper three-phase short activation threshold voltage level 306 and a lower UCG activation threshold voltage level 308, the three phase short command and UCG command signal 310 provided within the protection controller 150 to the "upper on" component 161 and the "lower on" component 162, and the PWM gate signals 312 as provided to the gate signal output 159 of the protection controller 150.

During normal inverter 110 operation, the motor control processor sends PWM signals to the PWM input 156 of the protection controller 150. As shown on the left hand side of the timing diagram 300, when not in a fault condition, the protection controller 150 passes the PWM signals 312 to the gate drive circuit 170. At time 314, however, the inverter 110 is disabled by a serious fault, such as IGBT desaturation fault, loss of bias power, microcontroller malfunction, DC bus 115 over-voltage, or over-current, and inverter 110 operation stops. If the motor 105 is at sufficiently high speed 302 at the time 314 of the inverter fault, UCG mode ensues and the DC bus voltage 304 increases.

The protection controller 150 continually monitors the DC bus 115 voltage (steps 204, 211). As the DC bus 115 voltage level 304 reaches the three phase short activation threshold voltage level 306 at time 316, the normal PWM signals 312 to the gate drive circuit 170 is disconnected by protection controller (step 210). The protection controller 150 then provides the three phase short signal 310 to generate gate signals for either all upper switches or all lower switches (step 214) to produce a three phase short at the motor 105 inputs.

After activation of the three phase short 310, the back-EMF of the electric motor system 100 is no longer charging the DC bus 115. Therefore the voltage level 304 decreases due to loading effects from components connected to the DC bus 115. When the DC bus 115 voltage level 304 drops below a second lower threshold 308 at time 318, the three phase short command 310 is turned off, which allows the electric motor system 100 to enter the UCG mode again. Depending on the machine speed 302 at the time of deactivation of the three phase short (e.g., at time 318), the DC bus 115 voltage level may rise above the activation threshold 306 again, at which point the three phase short command 310 may be applied again. By activating and de-activating the three phase short command 310 in this fashion, the DC bus 115 voltage level can be confined between the two threshold levels 308, 306 until the motor 105 slows down enough (i.e., below motor speed 320) such that the DC bus 115 voltage level is not high enough to trigger the three phase short command. Thus, after time 322, UCG mode is safe and the three phase short command 310 is no longer required.

Thus it can be seen that the protection circuit 150 is connected to the DC bus 115 for both bias power and voltage sense control parameter for activation of protection modes, and thereby protects against inverter 110 malfunctions due to a large number of potential problems, including loss of bias power of the inverter, processor malfunction, power switch malfunction or sensor malfunctions, while not requiring an external source of bias power. In addition, in electric motor systems 100 where a primary method of protection exists, the protection circuit 130 in accordance with the embodiment of the present invention can serve as a redundant backup protection for the inverter 110.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An inverter protection circuit for protecting an inverter in a permanent magnet electric motor system which includes a direct current (DC) bus for operational voltage to the inverter, the inverter protection circuit, comprising:
    a protection controller coupled to the DC bus and detecting predetermined inverter fault conditions from the voltage provided thereby;
    a power supply coupled to the DC bus and the protection controller for utilizing the voltage provided from the DC bus to power the protection controller; and
    a gate drive circuit coupled to the protection controller for receiving gate signals therefrom, the gate signals comprising a pulse width modulated (PWM) gate control signal and gate protection signals, wherein the gate protection signals are generated by the protection controller in response to detection of the predetermined inverter fault conditions.

2. The inverter protection circuit in accordance with claim 1, wherein the inverter comprises switching elements, each of the switching elements operable in response to drive signals from the gate drive circuit for rerouting voltage from the DC bus to a motor operating under the control of the inverter, the drive signals generated by the gate drive circuit in response to the gate signals.

3. The inverter protection circuit in accordance with claim 2 wherein the motor has a predetermined number of windings for producing phases thereof, each of a first portion of the switching elements connected between a high voltage node of the DC bus and one of the predetermined number of windings and each of a second portion of the switching elements connected between one of the predetermined number of windings and a low voltage node of the DC bus.

4. The inverter protection circuit in accordance with claim 3 wherein the drive signals comprise a PWM drive signal generated in response to the PWM gate control signal and provided to the switching elements for control thereof, a first fault drive signal generated in response to a first one of the gate protection signals and provided to the first portion of the switching elements for connecting the high voltage node of the DC bus to each of the predetermined number of windings, a second fault drive signal generated in response to a second one of the gate protection signals and provided to the second portion of the switching elements for connecting the low voltage node of the DC bus to each of the predetermined number of windings, and a third fault drive signal generated in response to a third one of the gate protection signals and provided to the first and second portions of the switching elements for opening the first and second portions of the switching elements.

5. The inverter protection circuit in accordance with claim 3 wherein the motor is a synchronous three-phase motor having three windings, and wherein the first portion of the switching elements comprise three switching elements, and wherein the second portion of the switching elements comprises three switching elements.

6. The inverter protection circuit in accordance with claim 1 wherein the protection controller includes a fault detecting input coupled to the DC bus to sense the predetermined motor control fault conditions.

7. The inverter protection circuit in accordance with claim 6 wherein the fault detecting input is a voltage sense input connected across the DC bus, and wherein the predetermined motor control fault conditions include an uncontrolled generation (UCG) of back electromotive force (back-EMF) voltage greater than a predetermined voltage level.

8. The inverter protection circuit in accordance with claim 3 wherein the protection controller comprises:
    a bias power input coupled to the power supply for receiving a bias power input therefrom;
    a fault detecting input connected to a high voltage node of the DC bus and a low voltage node of the DC bus, the protection controller detecting the predetermined motor control fault conditions including a first predetermined fault condition and a second predetermined fault condition in response to the voltage sensed across the DC bus at the voltage sense input;
    a pulse width modulated (PWM) input for receiving a PWM signal from a motor control processor;
    a gate signal output for providing the gate signals to the gate drive circuit, wherein the gate protection signals comprise a first gate protection signal and a second gate protection signal;
    a PWM pass component coupled to the PWM input and the gate signal output for providing the PWM signal to the gate signal output as the PWM gate control signal when the protection controller does not detect any predetermined inverter fault conditions and for not providing the PWM signal to the gate signal output when the protection controller does detect any predetermined inverter fault conditions;
    a first fault response component for generating the first or second gate protection signals and providing them to the gate signal output in response to detection of a first one of the predetermined inverter fault conditions; and
    a second fault response component for generating the third gate protection signal and providing it to the gate signal output in response to detection of a second one of the predetermined inverter fault conditions.

9. The inverter protection circuit in accordance with claim 8 wherein the wherein the drive signals comprise a PWM drive signal generated in response to the PWM gate control signal, a first fault drive signal generated in response to the first gate protection signal, a second fault drive signal generated in response to the second gate protection signal and a third fault drive signal generated in response to the third gate protection signal, and
    wherein the gate drive circuit provides the PWM drive signal and the third fault drive signal to the first and second portions of the switching elements for control thereof, provides the first fault drive signal to the first portion of the switching elements for connecting the high voltage node of the DC bus to each of the predetermined number of windings to provide protection for the inverter, and provides the second fault drive signal to the second portion of the switching elements for connecting the low voltage node of the DC bus to each of the predetermined number of windings to provide protection for the inverter.

10. A method for protecting a motor control circuit in a permanent magnet electric motor system, the method comprising the steps of;
sensing predetermined motor control circuit fault conditions on a direct current (DC) bus providing power to the motor control circuit, the predetermined motor control circuit fault conditions sensed by a protection circuit powered by the DC bus; and
generating gate protection signals for provision to the motor control circuit, the gate protection signals generated in response to sensing the predetermined motor control circuit fault conditions on the DC bus.

11. The method in accordance with claim 10 further comprising the step of initiating predetermined fault condition responses in response to the gate protection signals.

12. The method in accordance with claim 11 wherein the step of initiating the predetermined fault condition response comprises the steps of:
generating fault drive signals in response to the gate protection signals; and
providing the fault drive signals to switching elements of the motor control circuit for providing protection for the motor control circuit.

13. The method in accordance with claim 12 wherein the step of initiating the predetermined fault condition response further comprises the step of the switching elements rerouting current in the motor control circuit in response to the fault drive signals to provide protection for the motor control circuit.

14. The method in accordance with claim 13 wherein the fault drive signals include at least a first drive signal and a second drive signal, and wherein the motor control circuit is an inverter comprising the switching elements coupled between the DC bus and a permanent magnet motor of the electric motor system, a first portion of the switching elements connected between a high voltage node of the DC bus and windings of the motor and a second portion of the switching elements connected between a low voltage node of the DC bus and the windings of the motor, and wherein the step of rerouting voltage in the motor control circuit comprises the steps of:
a first portion of the switching elements connecting the high voltage node of the DC bus directly to each of the windings of the synchronous motor in response to the first drive signal; and
a second portion of the switching elements connecting the low voltage node of the DC bus directly to each of the windings of the synchronous motor in response to the second drive signal.

15. The method in accordance with claim 14 further comprising the steps of:
monitoring a current flowing on the DC bus;
detecting a desaturation fault in response to the current flowing on the DC bus being greater than a predetermined current;
switching from providing the first drive signal to providing the second drive signal in response to detecting a desaturation fault while the first drive signal is being provided to the motor control circuit; and
switching from providing the second drive signal to providing the first drive signal in response to detecting a desaturation fault while the second drive signal is being provided to the motor control circuit.

16. The method in accordance with claim 10 wherein the step of sensing the predetermined motor control circuit fault conditions comprises the step of sensing a voltage on the DC bus.

17. A method for protecting a motor control circuit in a permanent magnet electric motor system, the method comprising the step of sensing predetermined motor control circuit fault conditions on a direct current (DC) bus providing power to the motor control circuit by detecting the predetermined motor control circuit fault conditions in response to sensing a voltage on the DC bus greater than a predetermined uncontrolled generation (UCG) of back electromotive force (back-EMF) voltage, the predetermined motor control circuit fault conditions sensed by a protection circuit powered by the DC bus.

18. An electric motor system comprising:
a permanent magnet electric motor having a predetermined number of windings corresponding to the phases of the permanent magnet electric motor;
a direct current (DC) bus coupled to a power source and providing operational voltage for the electric motor system;
a motor control circuit connected to the DC bus for receiving the operational power therefrom for operation of the motor control circuit, the motor control circuit also connected to the windings of the permanent magnet electric motor for controlling the permanent magnet electric motor; and
a protection circuit connected to the DC bus for receiving the voltage therefrom for operation of the protection circuit, wherein the protection circuit is also connected to the DC bus for detecting predetermined motor control circuit fault conditions and, in response thereto, generating gate protection signals for protection for the motor control circuit,
wherein the motor control circuit is coupled to the protection circuit and operates in response to either a pulse width modulated (PWM) signal from a motor control processor or fault drive signals provided from the protection circuit in response to the gate protection signals generated thereby.

19. The electric motor system in accordance with claim 18 wherein the protection circuit comprises:
a protection controller coupled to the motor control circuit, the protection controller detecting the predetermined motor control circuit fault conditions and generating the gate protection signals in response to the predetermined motor control circuit fault conditions; and
a power supply coupled to the DC bus and the protection controller for utilizing the voltage provided from the DC bus to power the protection controller,
wherein the motor control circuit is an inverter comprising switching elements connected between the DC bus and the predetermined number of windings of the permanent magnet electric motor, and wherein each of the switching elements connects a high voltage node or a low voltage node of the DC bus to one of the predetermined number of windings of the permanent magnet electric motor in response to either the PWM signal or the fault drive signals generated by the protection circuit in response to the gate protection signals.

* * * * *